Aug. 10, 1943.   R. L. DILLON   2,326,443
AUTOMOBILE RADIO ANTENNA
Filed Nov. 7, 1938   3 Sheets-Sheet 1
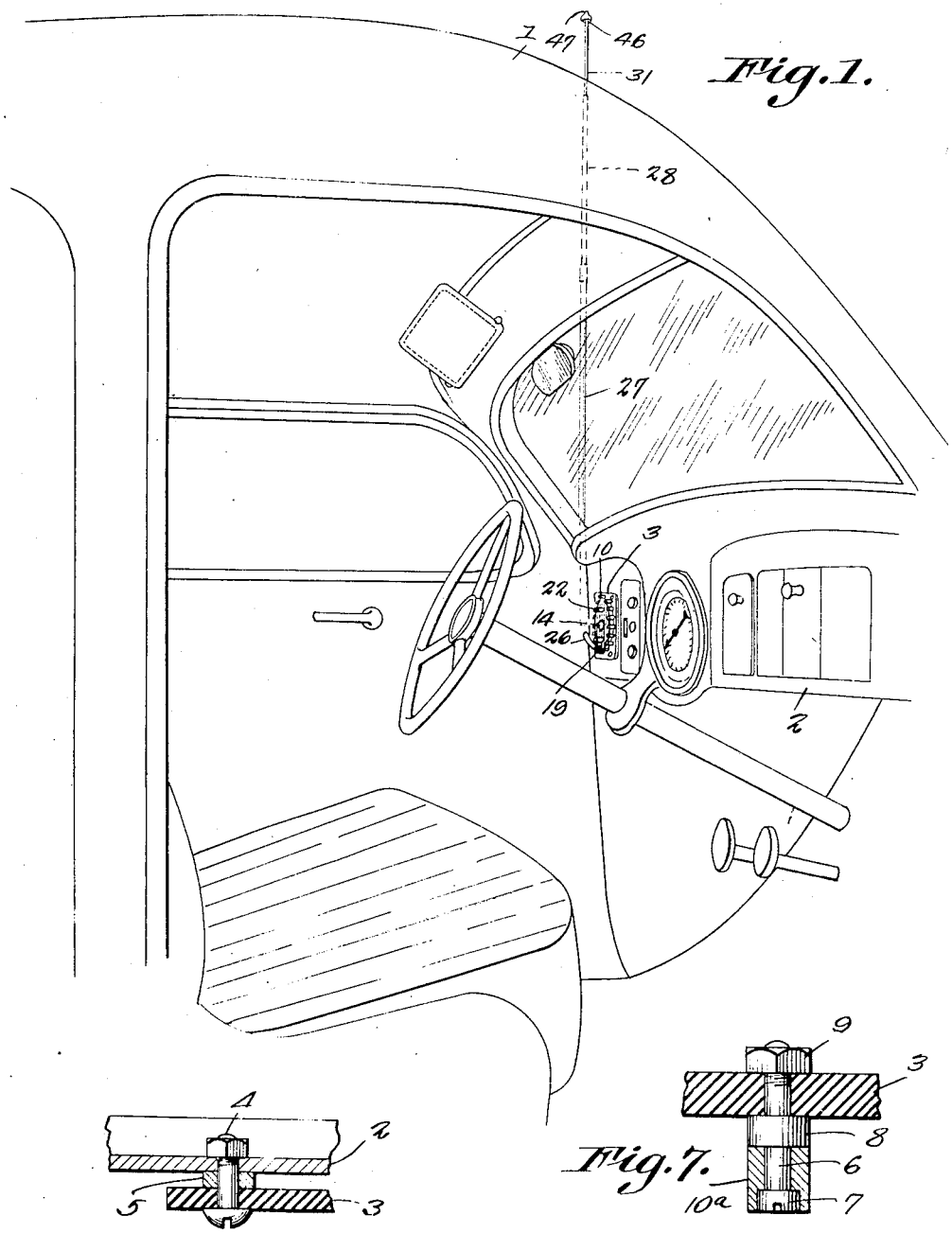
Fig. 1.
Fig. 6.
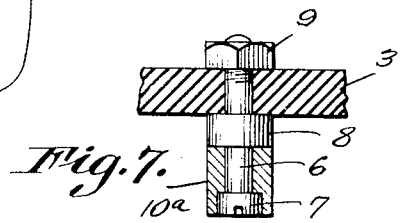
Fig. 7.
Robert L. Dillon
INVENTOR.
BY *CA Snow & Co.*
ATTORNEYS.

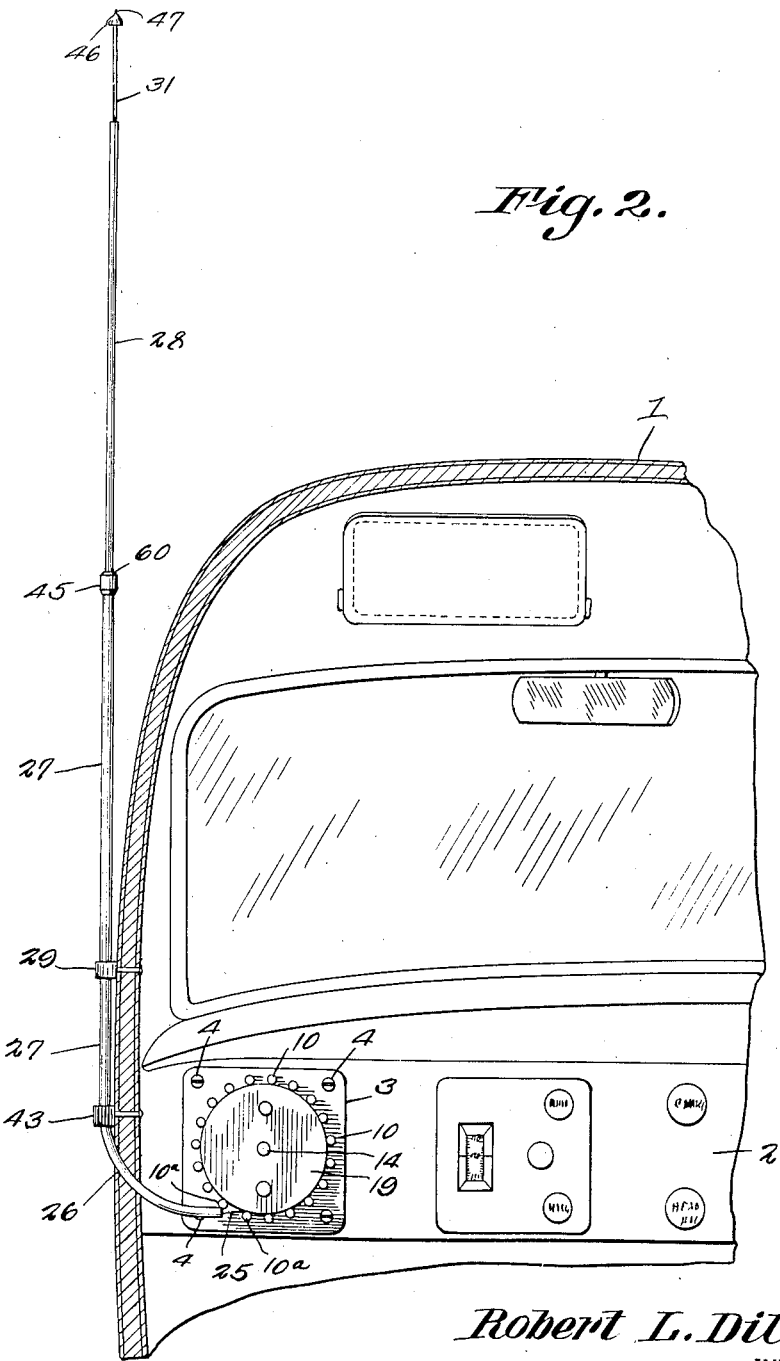

Aug. 10, 1943.      R. L. DILLON      2,326,443
AUTOMOBILE RADIO ANTENNA
Filed Nov. 7, 1938      3 Sheets-Sheet 3
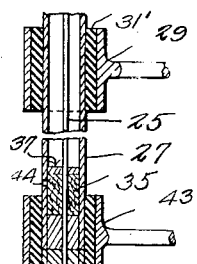
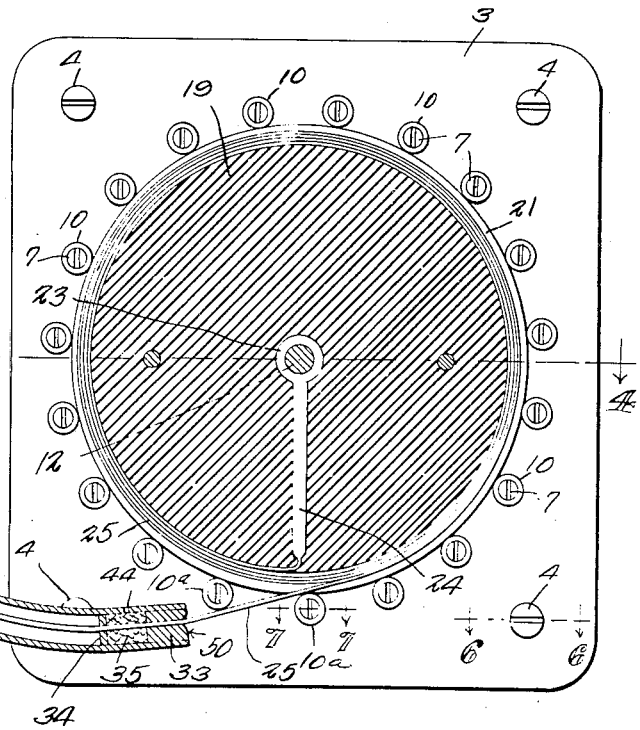
Fig. 3.
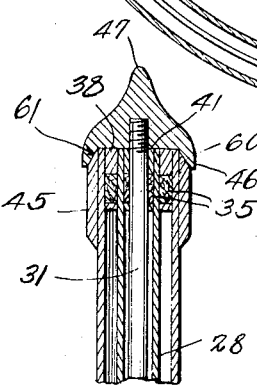
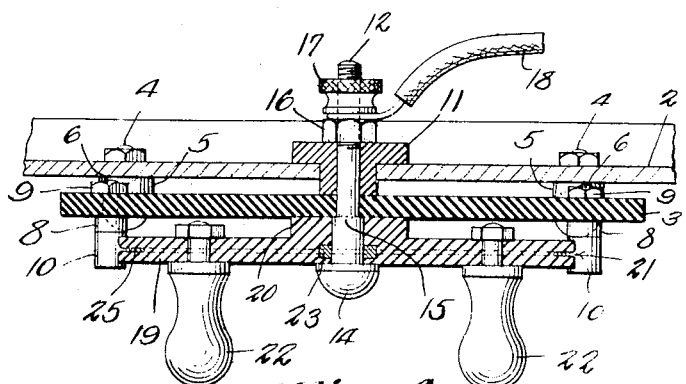
Fig. 4.
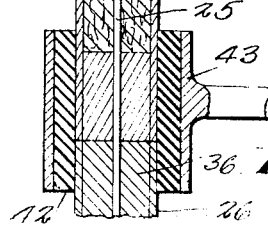
Fig. 5.
Robert L. Dillon
INVENTOR.
BY C. A. Snow & Co.
ATTORNEYS.

Patented Aug. 10, 1943

2,326,443

UNITED STATES PATENT OFFICE 2,326,443

AUTOMOBILE RADIO ANTENNA

Robert Louis Dillon, Manchester, N. H., assignor of one-half to D. J. Sullivan, Nashua, N. H.

Application November 7, 1938, Serial No. 239,363

14 Claims. (Cl. 250—33)

This invention aims to provide a novel antenna, adapted to be carried on an automobile, the antenna being telescopic, and novel means under the control of an operator being provided for extending and shortening the antenna from a place within the auto.

It is within the province of the disclosure to improve generally and to enhance the utility of, devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 is a perspective showing a portion of an auto, whereon the device forming the subject matter of this application has been mounted;

Fig. 2 is a cross section showing a portion of an auto in which the device forming the subject matter of this application has been incorporated;

Fig. 3 is a vertical sectional view illustrating the reel construction and parts of the antenna;

Fig. 4 is a cross section on the line 4—4 of Fig. 3;

Fig. 5 is a vertical section, showing the antenna in its shortened condition;

Fig. 6 is a cross section on the line 6—6 of Fig. 3;

Fig. 7 is a cross section on the line 7—7 of Fig. 3.

In the following description, words grounded on a "front" or "back" concept have reference to the forward and rear ends of an automobile.

The numeral 1 marks a vehicle, such as an auto, including an instrument board 2. Behind the instrument board 2 is located a plate-like insulating reel base 3. Securing elements 4 attach the reel base 3 to the instrument board 2, as shown in Fig. 6. Washers 5, on the securing elements 4, space the reel base 3 from the instrument board 2.

Referring to Fig. 7, it will be noted that bolt studs 6 pass through the reel base 3, the bolt studs having rear heads 7 and fixed intermediate collars 8. Nuts 9 are threaded on the forward ends of the bolt studs 6, and, thus, the bolt studs are fastened in the reel base 3. Rollers 10 and 10a are journaled on the bolt studs 6, between the collars 8 and the heads 7. The heads 7 of the bolt studs 6 may be let into the rear portions of the rollers 10 (Fig. 7), flush with the rear end surfaces of the rollers. The bolt studs 6 and the rollers 10 are arranged in a circle on the reel base 3, as can be seen best in Fig. 3, the position of the reel base on the instrument board 2 appearing in Figs. 1 and 2.

An insulating bearing 11, disclosed in Fig. 4, is secured in the instrument board 2, concentrically with respect to the circle defined by the rollers 10. A fixed shaft 12 extends through the bearing 11, the shaft having a head 14 and a shoulder 15. A nut 16 is threaded on the forward part of the shaft 12 and engages the bearing 11, the shoulder 15 being drawn into tight contact with the reel base 3, and the shaft 12 thus being held fixed with respect to the reel base. A binding nut 17 is threaded on the forward part of the shaft 12, one end of a lead-in conductor 18 being bound between the nuts 17 and 16.

The numeral 19 designates a circular, disk-like reel body, mounted to rotate on the shaft 12, between the head 14 of the shaft and the reel base 3, the reel body having a hub 20 which spaces it from the reel base 3. Here note that the periphery of the reel body 19 moves in close relation to, and preferably in contact with, the rollers 10 that are journaled on the reel base 3, a feature the utility of which will be made manifest hereinafter. The reel body 19 is provided with a peripheral groove or seat 21. The reel body 19 may be rotated in any appropriate way, for instance by means of oppositely-disposed handles 22 on the reel body.

A collector-ring 23 is mounted in the reel body 19 and is disposed about the rear part of the shaft 12. To the collector-ring 23 is connected the inner end of a conducting strip 24, the strip being extended outwardly in the reel body 19, and being joined to a flexible element 25, wound in the seat 21 of the reel body. At this place it may be observed that the rollers 10 extend across the groove or seat 21 of the reel body 19. The flexible element 25, which may be a metal wire, at times exerts a pull, to telescope and lower the antenna, hereinafter described; and, again, the flexible element 25 exerts a thrust, to elongate and raise the antenna. When the flexible element 25 exerts a thrust on the antenna, there is a tendency for the flexible element to expand out of the seat 21 in the reel body 19, but that expansion is checked by the rollers 10 on the reel base 3. It is shown in Fig. 3 that two of the rollers 10, designated specifically by the character 10a, serve as guides, directing the flexible element 25 into the circumferential seat 21 of the reel body 19.

An antenna is provided, and includes a first, tubular, curved, lower section 26, prolonged through and fixed in the wall of the auto 1, the section 26 being extended into close relation to the reel body 19, as Figs. 2 and 3 show. The lower end of a second straight, vertical, tubular, antenna section 27 abuts against the upper end of the first section 26. Telescoped in the second section 27 is a third section 28, provided at its lower end with a foot 32, received slidably in the second section 27. The abutting ends of the antenna sections 26—27, are received within an insulating sleeve 42, forming part of a lower supporting bracket 43, secured on the side wall of the auto 1. An upper bracket 29, having an insulating sleeve 31', receives the second section 27 and secures it to the side wall of the auto 1.

Referring to Fig. 3, a gland 50 is mounted to the inner or lower end of the first antenna section 26, and includes a stopper block 33, a partition 34, and an absorbent packing 35 between the stopper block and the partition. In the upper end of the antenna section 26 there is a like gland 36, a like gland 37 being mounted in the lower end of the second section 27, a like gland 38 being mounted in the upper end of the second section 27, and a like gland 41 being mounted in the upper end of the section 28. The packings 35 of all of these glands may be charged with oil through suitably located oil holes 44. The flexible element 25 slides in the gland 50 of Fig. 3, in the gland 36, and in the gland 37. The section 28 of the antenna slides in the gland 38 of the section 27 and the rod-like upper or fourth member 31 of the antenna slides in the gland 41 of the section 28, the member 31 having a foot 70 which slides in the antenna section 28. The upper end of the flexible element 25 is secured to the foot 70 of the uppermost antenna section 31.

On the upper end of the second antenna section 27 is mounted a circumscribing band 45, having a tapered upper end 69, adapted to be received in a correspondingly shaped seat 61, formed in a skirt 46 constituting part of an ornamental head 47 mounted on the upper end of the fourth antenna section 31. When the antenna is collapsed, as shown in Fig. 5, the seat 61 of the skirt 46 of the head 47 cooperates with the beveled upper end 69 of the band 45, and thus a weather-tight joint is effected.

When the antenna is raised as in Fig. 2, by means of the flexible element 25 and the cooperating parts 32—38 and 70—41 of Fig. 5, radiant energy is received by the upper antenna section 31 and passes along the flexible element 25 to the shaft 12 of Fig. 4, and thence into the conductor 24, the collector ring 23, the shaft 12 and the conductor 18, adequate provision being made at all necessary points to prevent undesirable grounding.

The reel body 19 is turned by means of the handles 22, to advance or retract the flexible element 25, that element, although flexible, being stiff enough to extend the antenna to the condition shown in Fig. 2. By a reverse rotation of the reel body 19, the antenna may be telescoped to the condition of Fig. 5. Part of the flexible element 25 is coiled in or drawn out of the peripheral circumferential seat 21 of the reel body 19, the rollers 10 on the reel base 3 preventing the flexible element from jumping out of the seat at any time.

The member 1, although depicted as an auto, may be of another form, and, therefore, it may be designated generally as a "support."

Having thus described the invention, what is claimed is:

1. A radio antenna comprising telescopically assembled sections, and means for extending and telescoping the sections, said means comprising a flexible push and pull element passing through the sections, the sections being provided with absorbent packings, with means for retaining the packings in place, and with means for lubricating the packings; the push and pull element passing through the lubricated packings, and the packings promoting easy longitudinal movement of the push and pull element and tending to prevent buckling thereof.

2. A radio antenna constructed as set forth in claim 1, in combination with a housing, a curved tube, one end of which enters the housing, mechanism within the housing for operating the push and pull element, the tube being provided with a packing, a retaining means therefor, and a lubricating means, all located closely adjacent to said mechanism and tending to avoid buckling of the push and pull element, between said means and said end of the tube.

3. In a device of the class described, a support, an insulating reel base disposed adjacent to the support, retainers arranged in a circle on the base, securing elements connecting the base with the support and spacing the base from the support to provide room for securing the ends of the retainers to the base, a shaft mounted in the base and in the support, a reel mounted to turn on the shaft and having a peripheral groove located in close relation to the retainers, a handle on the reel, the reel having a hub engaging the base to space the reel from the base and leave room for securing the end of the handle to the reel, a telescopic antenna, and means for operating the antenna, said means including a flexible element passing down the periphery of the reel, in the groove thereof, and within the circle defined by the retainers, the flexible element passing through the reel, into conducting engagement with the shaft, and means for connecting a lead-in to the shaft, on the opposite side of the support from the reel base.

4. An automotive vehicle antenna combination including, a basic support section adapted to have other sections telescopically housed therein with means for preventing the sections from being separated when the sections are moved to extended position, the basic section being insulatingly mounted on a part of the vehicle, a flexible member having one end fastened to the lower end of the inner antenna section and means under control of an occupant of the vehicle for acting on said flexible member to move said sections to extended position and also to move them to retracted position, and a receiver for the flexible member when the antenna is in retracted position.

5. In an antenna device of the type described, a plurality of telescoping elements of conducting material; means for securing one of said elements to a vehicle; elongate flexible means mounted in said telescoping elements and having one end thereof fixed to the uppermost element; and means for urging the elongate flexible means in either of two directions to cause the telescoping elements to extend or contract.

6. A collapsible antenna structure comprising a plurality of telescoping elements of conducting material and forming when extended an elongate staff means for attaching the lowermost of said elements to a portion of a vehicle; a flexible wire mounted in said sections and having one end secured to the top of the staff; and a reel to which the other end of the wire is secured, the wire being adapted to be wound upon said reel when the same is rotated in one direction to collapse the elements and to extend the elements when unwound therefrom upon rotation of the reel in the opposite direction.

7. In an extensible antenna assembly adapted to be mounted on a motor vehicle, a tubular member adapted to be mounted fixedly with respect to said body and electrically insulated therefrom, an extensible antenna rod slidable within said member to be extended and retracted with respect to said member, a reel mounted for rotation adjacent said member, a flexible connecting member coiled about said reel and passing within said tubular member and secured to said rod, a sheath surrounding said connecting member between said reel and said tubular member.

8. In an antenna assembly adapted to extend on the exterior of a vehicle body and operable from the interior thereof, a tubular support adapted to be secured to the said body, a sleeve carried by said support and slidable therein, a rod slidably carried by said sleeve, projections at each end of said rod to engage and pull said sleeve, a reel mounted for rotation adjacent said support, a sheath leading from said support to said reel, a flexible member carried by said reel and passing through said sheath and secured to the inner end of said rod and means to rotate said reel and thereby shift said rod and said sleeve relative to each other and said support.

9. In an extensible antenna assembly adapted to be mounted on a motor vehicle, an extensible radio signal-carrying member mounted on said vehicle for extension and retraction with respect thereto, a flexible actuating member secured to said extensible member, a reel structure rotatably carrying a circular disc having a groove in its peripheral edge to receive said flexible member in stacked turns, the disc by its rotation causing said flexible member to actuate said extensible member, and a plurality of rotatable circular members carried by the reel structure arcuately positioned around and closely adjacent said disc to hold said turns in working order within said groove.

10. In an extensible antenna assembly adapted to be mounted on a motor vehicle, an extensible radio signal-carrying member mounted on said vehicle for extension and retraction with respect thereto, a flexible actuating member secured to said extensible member, a reel structure carrying a rotatable disc, a coil-receiving recess formed in said disc and adapted to receive said flexible member therein in a series of turns of different diameter, and guide means carried by the reel structure and arcuately positioned around and closely adjacent said disc to hold said turns in working order within said recess.

11. In an extensible antenna assembly adapted to be mounted on a motor vehicle, an extensible radio signal-carrying member mounted on said vehicle for extension and retraction with respect thereto, a flexible actuating member secured to said extensible member, a reel adapted to receive said flexible member and by its rotation cause said flexible member to extend or retract said extensible member and means rotatable simultaneously with said reel to help guide and prevent binding of the cable as it is extended from and retracted on the reel.

12. In an extensible antenna assembly adapted to be mounted on a motor vehicle, an extensible radio signal-carrying member mounted on said vehicle for extension and retraction with respect thereto, a flexible actuating member secured to said extensible member, a reel having a recess therein to receive said flexible member and by its rotation to cause said flexible member to extend or retract said extensible member, and means positioned around said recess and closely adjacent the opening into said recess to hold said flexible member in operative position within said recess.

13. An automotive vehicle antenna combination including, a basic tubular section adapted to have other sections telescopically housed therein with means for preventing the sections from being separated when the sections are moved to extended position, an insulating support and guide for the basic section, a member relatively stiff for longitudinal stresses, but easily bendable and having one end fastened to the inner antenna section, and means under control of an occupant of the vehicle for acting on said member to move said sections in the desired direction, and a receiver for the said member.

14. A radio antenna for mounting on the body of a vehicle, the antenna having a plurality of relatively movable telescopic sections, the basic one of which extends within and is insulatingly mounted on a part of the body of the vehicle, and means for extending from the basic section the other sections to any desired height within the full-length range of the antenna, and retracting the sections when desired, said means acting to push the inner located section out of its immediately surrounding section which is then pulled out of the basic section.

ROBERT L. DILLON.